United States Patent [19]

Mayor et al.

[11] Patent Number: 4,695,698

[45] Date of Patent: Sep. 22, 1987

[54] METHOD OF, AND APPARATUS FOR, GENERATING A PREDETERMINED PATTERN USING LASER RADIATION

[75] Inventors: Jean-Michel Mayor, Lausanne; Jürg Steffen, Sigriswil; Peter Wüthrich, Frauenfeld, all of Switzerland

[73] Assignee: Larassay Holding AG, Thundorf, Switzerland

[21] Appl. No.: 751,258

[22] Filed: Jul. 2, 1985

[30] Foreign Application Priority Data

Jul. 10, 1984 [CH] Switzerland .......................... 3337/84
May 22, 1985 [CH] Switzerland .......................... 2174/85

[51] Int. Cl.[4] .............................................. B23K 26/00
[52] U.S. Cl. ............................ 219/121 L; 219/121 LS; 219/121 LW; 219/121 LQ; 346/76 L
[58] Field of Search ...... 219/121 L, 121 LQ, 121 LM, 219/121 LH, 121 LJ, 121 LS, 121 LW; 346/76 L, 108

[56] References Cited

U.S. PATENT DOCUMENTS 4,002,829 1/1977 Hutchison .......................... 346/76 L Primary Examiner—C. L. Albritton
Attorney, Agent, or Firm—Werner W. Kleeman

[57] ABSTRACT

A writing laser beam and a scanning laser beam are coaxially superposed for position determination and for correcting mechanical movements during the writing of lines of a desired pattern into a metalized three-dimensional integrated circuit. The coaxially superposed writing and scanning laser beams are directed, using a single beam splitter for the scanning laser beam, to a lens head and to a workpiece as well as to a turret for alternately employing one of a number of measuring or observing instruments. The individual members are precisely adjustable and during automatic evaluation of the thus determined values, correction of any error that may occur, can be directly obtained at the desired rate by such automatic evaluation. In order to properly arrange and shorten the radiation paths there is used a laser beam collimator which preferably is also provided with a writing laser beam detector. Furthermore, a scanning laser beam detector can be arranged to follow the beam splitter for the scanning laser beam. A very simple optical connection exists between the lens head and the turret, whereby the occurrence of errors due to vibrations is prevented. The inventive method and apparatus are particularly suited for the rapid and precise treatment of metalized three-dimensional integrated circuits or wafers.

58 Claims, 19 Drawing Figures

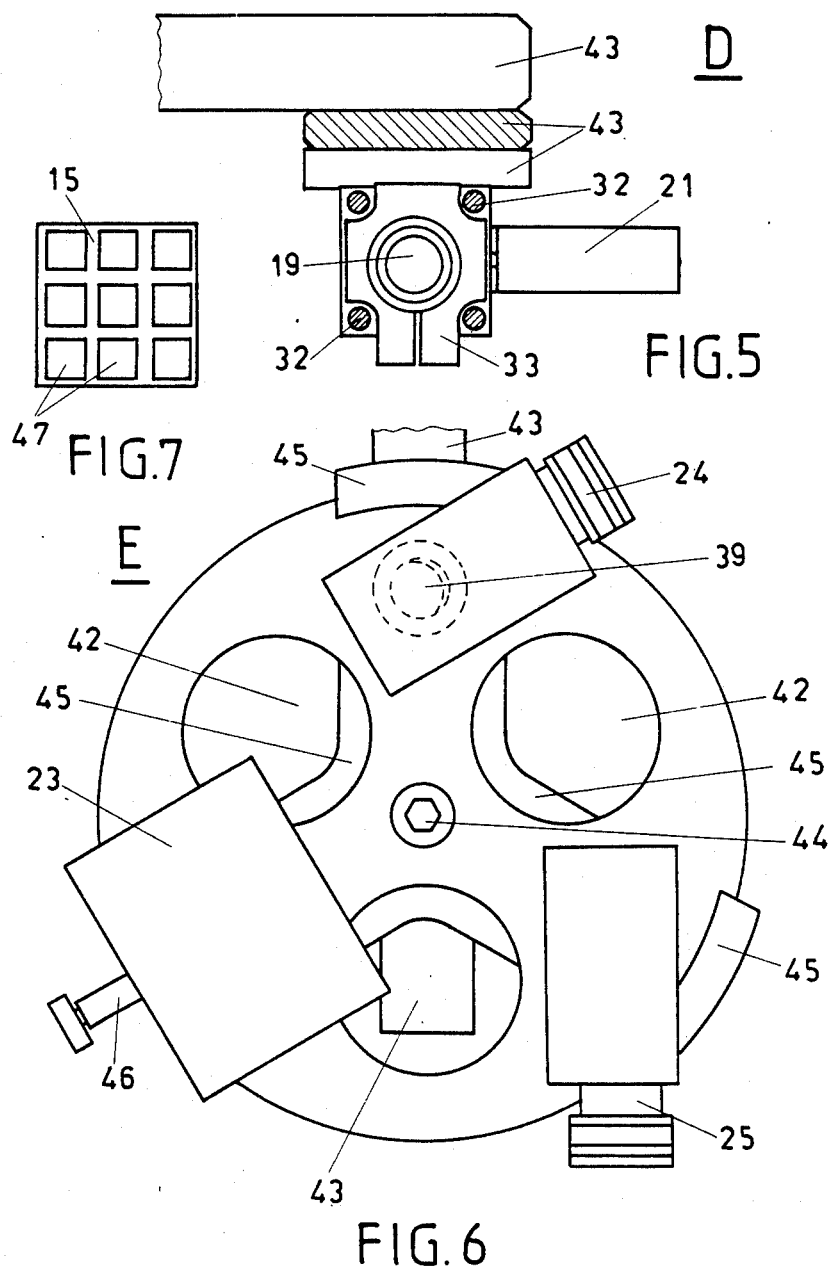

METHOD OF, AND APPARATUS FOR, GENERATING A PREDETERMINED PATTERN USING LASER RADIATION

CROSS-REFERENCE TO RELATED APPLICATION

This application is related to the commonly assigned, co-pending U.S. application Ser. No. 06/463,817, filed Feb. 4, 1983, and entitled "METHOD OF MAKING ELECTRICALLY CONDUCTIVE REGIONS IN MONOLITHIC SEMICONDUCTOR DEVICES AS APPLIED TO A SEMICONDUCTOR DEVICE".

BACKGROUND OF THE INVENTION

The present invention relates to a new and improved method of, and apparatus for, generating by means of a writing laser beam a predetermined pattern on a workpiece containing a three-dimensional integrated circuit and which is provided with a metalized screen. The apparatus of this type is also termed . "laser pattern generator" in the art.

In a method of, and apparatus for, generating a predetermined pattern by means of a writing laser beam as known, for example, from European Patent Publication No. 0,128,993, a scanning laser beam is used in addition to the writing laser beam. During the treatment of the workpiece with the writing laser beam, the scanning laser beam scans the surface of the workpiece. The radiation of the scanning laser beam is reflected by the surface of the workpiece and received and evaluated by means of a radiation detector which may constitute, for example, a differential photodiode. The evaluated measurements are then used for automatically detecting or regulating the movement of the workpiece relative to the writing laser beam.

In a further known method of generating a predetermined pattern by means of a writing laser beam as known, for example, from European Patent Publication No. 0,088,045, there are produced electrically conductive regions in integrated monolithic semiconductor arrangements and there is also described a semiconductor arrangement of high component density which is obtained using this method.

During the manufacture of customized integrated circuits there are used commercially available silicon disks or wafers which are provided with P- and N-structures or N- and P-structures at which specific contact surfaces must be produced which connect these structures and which depend on the purpose of use. Contrary to known technologies there are produced on a silicon disk or wafer electrically conductive regions with standard clearances which are arranged in accordance with a predetermined raster or grid. Such regions and standard clearances can be obtained, for example, by applying an etching or application technique. Depending on the intended circuit configuration, the conductive layer which may be composed, for example, of aluminum and which is present intermediate these clearances, is directly or indirectly removed by means of an electron beam or a beam of electromagnetic radiation. A laser beam is particularly suited for this process and such laser beam can be positioned and controlled in a simple manner and serves to irradiate a photosensitive layer. During such process the silicon disks or wafers are continuously displaced relative to the laser beam along the predetermined raster or grid and the laser power is turned on and turned off by means of a modulator in accordance with the desired removal geometry. The raster or grid spacing is in the order of magnitude of about 1 to about 7 $\mu$m, the width of the lines after removal is in the range of about 0.4 to 2 $\mu$m, and the treatment rate is in the order of magnitude of 1 to 2 hours per 4" silicon disk or wafer. There thus results a displacement rate in the range of 30 to 100 cm/s and a position tolerance in the range of 0.3 to 2.5 $\mu$m at a displacement length of 4". Such values for the position tolerance cannot be obtained using mechanical displacement means or units. The insular conductive regions are thereafter produced by using a photo-etching technique. By using this method expensive photomasks which are specific for each application, can be dispensed with. A semiconductor arrangement obtained in accordance with the aforementioned method comprises in its conductive layer, clearances which are arranged according to the predetermined raster or grid and which clearances constitute the end points or regions and/or the corner points or regions of insular conductive regions.

SUMMARY OF THE INVENTION

Therefore, with the foregoing in mind, it is a primary object of the present invention to provide a new and improved method of, and apparatus for, generating a predetermined pattern by means of a writing laser beam and which ensures precise guidance of the writing laser beam relative to the workpiece even in the case of three-dimensionally structured workpieces.

Another significant object of the present invention is directed to a new and improved method of, and apparatus for, generating a predetermined pattern by means of a writing laser beam and in which there is permitted a position determination or synchronization as well as a positional correction or correction of the mechanical non-linear displacement occurring between the relatively movable laser and workpiece.

A further important object of the present invention is directed to a new and improved method of, and apparatus for, generating a predetermined pattern by means of a writing laser beam and which enables the preparation of separating surfaces having a width, for example, of about 2 $\mu$m, i.e. of so-called lines, at a rate in excess of 300 mm/s.

Now in order to implement these and still further objects of the invention, which will become more readily apparent as the description proceeds, the method of the present development is manifested by the features that, the metalized raster or grid of the workpiece is scanned during the line-like or linear operating movements either by means of a modulated writing laser beam which is modulated, i.e. attenuated or not attenuated, by means of a modulator, or by means of a scanning laser beam aligned to or superposed upon the same optical axis. The reflected laser beam is received by at least one radiation detector and the output signals thereof are then evaluated. The evaluated signals are used to determine the position and to correct the relative displacement of the workpiece and the writing laser beam.

It is one advantage of the inventive method that the method enables precise guidance with respect to the relative positions of the workpiece and the writing laser beam, particularly also during the treatment of three-dimensional structures in which scattered light is formed and may falsify the determination of reference data. The writing laser beam can be used for the writing operation as well as for the scanning operation, if desired, in an attenuated condition.

According to a further development of the inventive method, the laser beam or the laser beams are transmitted to the treatment surface of the integrated circuit of the workpiece substantially normally thereto or at deviations from the normal direction up to about ±10°. Within the indicated tolerance range, the writing laser beam or the scanning laser beam operates sufficiently reliably.

According to a further development of the inventive method the correction for a displacement of the workpiece away from the line or predetermined pattern is performed by using a controllable beam deflector which may constitute, for example, a controllable reflecting mirror which is arranged precedingly of lens means, and/or by using a controllable parallel plate which is arranged at an inclination following the lens means, and/or by using a controllable displacement of the lens means. Using the various aforementioned operational steps, the desired correction can be obtained by employing simple means.

Preferably, a modulation signal of the writing laser beam directly controls the controllable gain of a signal amplifier in such a manner that the same output signals are obtained even at different beam powers.

In a further development of the inventive method the polarized writing laser beam impinges upon the treated surface of the workpiece through a polarizing beam splitter which acts as an optical analyzer with respect to the electro-optical modulator or modulator beam switch. The radiation detector receives the same radiative power in both states of the modulator or modulator beam switch.

Advantageously, a scanning laser beam is used in addition to the writing laser beam. The scanning laser beam is aligned to substantially the same axis or is substantially coaxially superposed by means of a dichroic beam splitter and then passes through the same radiation path as the writing laser beam. In this manner there is obtained a compensation for surface conditions of the integrated circuit contained in the workpiece and which surface conditions are unfavorable with respect to the wavelength of the writing laser beam. The wavelength of the scanning laser beam is selected differently from the wavelength of the writing laser beam. This particular method is required in the case that two substantially different wavelengths are required for the treatment of the surface of the workpiece.

In an advantageous further development of the inventive method scattered light is measured by an additional radiation detector in addition to the reflected laser beam. The ratio of the two signals is determined and there can thus be obtained a compensation for different local surface properties of the integrated circuits contained in the workpiece, like the reflective and scattering properties of the metalized surface and the material located therebelow. By using this method errors are prevented which might occur due to different materials or different treatments of the surface of the materials.

It is of particular advantage when the writing laser beam or blue beam and the scanning laser beam or red beam are reflected in a laser beam collimator towards a lens head by means of a beam splitter for the writing laser beam and a mirror for the scanning laser beam; a portion of the writing laser beam is deflected to a writing laser beam detector by means of the beam splitter for the writing laser beam. It is one advantage of this further development that the two laser beams can be precisely aligned in the laser beam collimator and this alignment is additionally monitored and controlled for the writing laser beam by the writing laser beam detector. Preferably, the metalized three-dimensional integrated circuit is covered by a photosensitive resist which is irradiated by the writing laser beam.

According to a further development of the inventive method the writing laser beam and the scanning laser beam are directed in the laser beam collimator substantially along the same axis to a beam splitter for the scanning laser beam which beam splitter is arranged at the lens head. The scanning laser beam and the writing laser beam are directed through the lens means to the workpiece by means of the beam splitter for the scanning laser beam. A portion of the reflected scanning laser beam is reflected into a turret through the beam splitter for the scanning laser beam. It is an advantage of this method that the common guidance of the writing laser beam and the scanning laser beam further increases the functional precision because the same optical components can be used for both of the laser beams at least in a predetermined part of the radiation path.

Preferably, the laser-light signals detected by the radiation detectors and/or the laser-light signals originating from the lens head and/or from the turret are evaluated such that the functional position is either detected or obtained. This method automatically operates at sufficient precision using generally known electronic means or components.

As already alluded to above, the invention is not only concerned with the aforementioned method aspects, but also relates to an improved construction of an apparatus for generating by means of a writing laser beam a predetermined pattern on a workpiece containing a three-dimensional integrated circuit and which is provided with a metalized raster or grid.

The inventive apparatus comprises a writing laser beam source containing a writing laser device with a series-connected modulator, an expander and lens means. For evaluation, a beam splitter which acts upon the light reflected by the workpiece, is associated with a radiation detector.

According to a further development of the inventive apparatus, the beam splitter constitutes a polarizing beam splitter which is provided as an optical analyzer with respect to the modulator which constitutes an electro-optical modulator.

In an advantageous construction of the inventive apparatus there is additionally provided a scanning laser beam source containing a scanning laser device which operates at a wavelength different from the wavelength of the writing laser beam generated by the writing laser device. A dichroic beam splitter is provided in order to superpose the scanning laser beam substantially upon the axis or optical axis of the writing laser beam and in order to subsequently separate the scanning laser beam and direct the same to a radiation detector. The use of a dichroic beam splitter enables a simple evaluation when two lasers of different wavelengths are employed in the apparatus.

Advantageously, control means for obtaining the correct relative positions of the integrated circuit contained in the workpiece and the laser radiation, contain a closed regulation loop comprising an operational amplifier and a high-voltage amplifier series-connected thereto and at least one piezo-element. The at least one piezo-element is particularly suitable for mechanically controlling the moveable members in a very fine and precise manner.

According to an advantageous further development of the inventive apparatus a lens head and a turret conjointly form an optical module possessing a connecting member which is solely constituted by the beam splitter for the scanning laser beam. This construction is particularly preferred because there is no deflecting mirror positioned intermediate the lens head and the turret and which deflecting mirror affects the scanning surface of the radiation detector and thus the rate of the detector.

Advantageously, there is provided a laser beam collimator which is provided with a radiation detector for the writing laser beam. This construction permits to correct the direction and, if desired, also the width of the writing laser beam immediately following the writing laser beam source and to detect any occurring inaccuracies.

In a preferred embodiment of the inventive apparatus the turret is provided with at least two of the following three units: scanning laser beam detector, shearing-interferometer eyepiece, and microscope eyepiece including graticule. Due to this arrangement there are positioned immediately adjacent the lens head, at least two preferred optical units or means for controlling the function of the inventive apparatus. The connection of these units or function controlling members with the turret saves appreciable space and permits any desired selection of a predetermined optical unit in combination with the lens head.

According to a further development of the inventive apparatus the writing laser beam source and/or the scanning laser beam source is provided with at least one pin-hole within the related expanders. This arrangement insures the formation of laser beams which are sufficiently free of image information and such laser beams are preferred in the aforementioned novel and inventive method.

Preferably, the microscope eyepiece of the lens head is provided with a blocking filter for the writing laser beam. This construction prevents possible damage to the human eye by excessive radiation power.

According to a further development of the inventive apparatus a radiation detector is arranged to follow the beam splitter for the scanning laser beam, and this radiation detector is arranged in the direction of the common axis along which the writing laser beam and the scanning laser beam are guided. This further radiation detector can control the direction of the common radiation path of the writing laser beam and the scanning laser beam.

It is of particular advantage when at least one radiation detector comprises a plural number of fields or active regions. This construction not only signals any occurring deviation from the desired direction but also the direction in which such a deviation occurs. The evaluation of any occurring deviation and its automatic correction is thereby facilitated.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 2 is a front view of the laser beam collimator in the apparatus shown in FIG. 1a;

FIG. 4 is a partially sectional view of an optical module comprising a lens head and a turret in the apparatus shown in FIG. 1a;

FIG. 5 is a section along the lines V—V in FIG. 4;

FIG. 6 is a top plan view of the turret shown in FIG. 4;

FIG. 7 is a top plan view of an exemplary embodiment of a radiation detector containing a plural number of fields or active regions and used in the apparatus shown in FIG. 1a;

DETAILED DESCRIPTION OF THE PREFERRED EMBODIMENTS

Figures 1A, 1B:
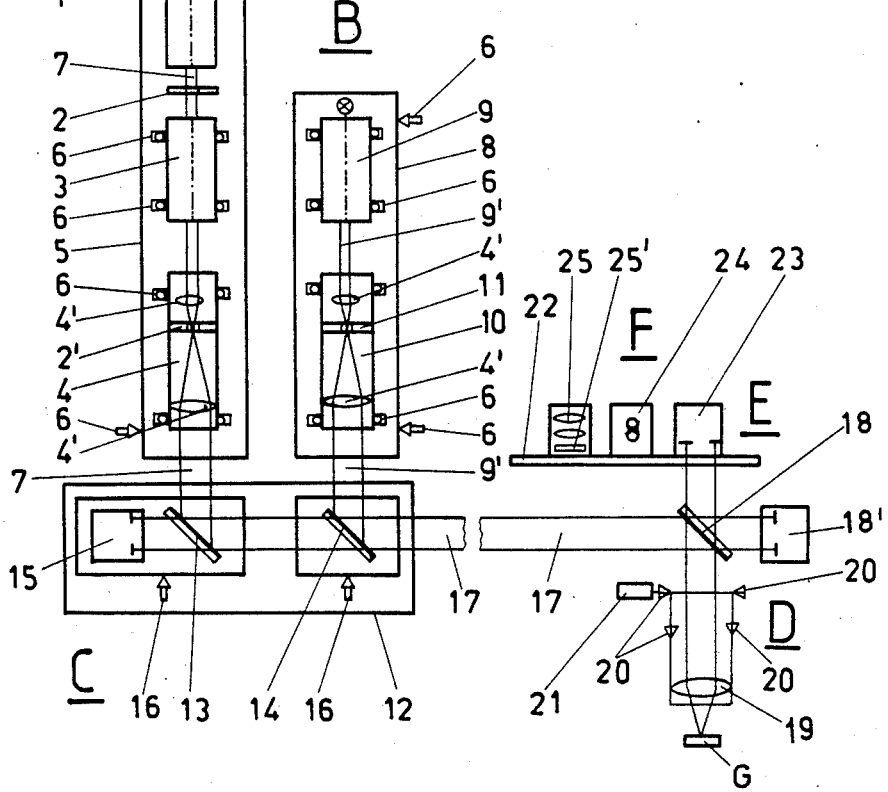
FIG. 1a is a schematically illustrated top plan view of a first part of the apparatus or arrangement in a particularly advantageous exemplary embodiment of the inventive apparatus.
FIG. 1b is a schematically illustrated front view of a second part of the inventive apparatus.

Describing now the drawings, it is to be understood that only enough of the construction of the laser apparatus has been shown as needed for those skilled in the art to readily understand the underlying principles and concepts of the present development, while simplifying the showing of the drawings. Turning attention now specifically to FIG. 1a, there are shown, of a first part of the inventive apparatus a writing laser beam source A and a scanning laser beam source B which are arranged in horizontal position and with parallel optical axes. The writing laser beam source A contains a writing laser device 1 which is followed by a laser beam switch 2 for turning-off the writing laser beam 7 in the open condition of the apparatus. An expander 4 is provided and a pin-hole 2' is arranged in the expander 4. Intermediate the writing laser device 1 and the expander 4 there is positioned a modulator 3 on the optical axis defined in the writing laser source A. The expander 4 contains lens means 4'. The entire writing laser beam source A is mounted in a housing 5. The modulator 3 and the expander 4 are held in the aforementioned housing 5 by means of adjustable mounting or fastening elements 6. The entire housing 5 is also provided with adjustable mounting or fastening elements 6 which permit the correct arrangement of the optical axis of the writing laser beam source A.

The scanning laser beam source B is mounted in a housing 8 and contains a scanning laser device 9 from which a scanning laser beam 9' is directed to an expander 10 of the scanning laser beam source B. This expander 10 also contains a pin-hole 11 in addition to lens means 4'. Other elements already mentioned hereinbefore in the description of the writing laser beam source A are also present in the scanning laser beam source B.

The scanning laser beam 9' emitted by the scanning laser device 9 is directed into the expander 10. The members or components of the scanning laser beam source B are mounted in a housing 8 which, like the housing 5 of the writing laser beam source A, can be correctly positioned by means of adjustable mounting or fastening elements 6.

A laser beam collimator C is located in the direction of the optical axes of the writing laser beam 7 and of the scanning laser beam 9'. This laser beam collimator C contains, in a housing 12, a beam splitter 13 for the writing laser beam 7 and a mirror 14 for the scanning laser beam 9'. In FIG. 1a these elements are illustrated in top plan view. These elements are adjustably mounted in the aforementioned housing 12 by means of adjusting or positioning elements 16. On the left-hand side of the beam splitter 13 for the writing laser beam 7 there is located a writing laser beam detector 15 which controls the correct starting position of the writing laser beam 7. The reflected writing laser beam 7 and the reflected scanning laser beam 9' are coaxially superposed or combined on one and the same optical axis 17' which directly leads towards the arrangement illustrated in FIG. 1b.

As shown in FIG. 1b, a second part of the inventive apparatus contains a vertically extending optical axis. The common radiation path 17 of the writing laser beam 7 and of the scanning laser beam 9' extends firstly to a beam splitter 18 for the scanning laser beam 9'. A predominant portion of the radiation is passed therefrom to lens means 19 of a lens head D and further to a workpiece G. A scanning laser beam detector 18' is located to follow the beam splitter 18 for the scanning laser beam 9' in the direction of the writing laser beam 7 and of the scanning laser beam 9' which are guided along the same optical axis 17'. It is the purpose of this scanning laser beam detector 18' to monitor the correct radiation path 17.

The lens means 19 are provided with adjusting or positioning elements 20 some of which are provided with a piezo-electric drive 21. Immediately above the lens head D there is rotatably arranged a turret E. The lens head D and the turret E form a functional unit or an optical module F. The turret E substantially contains a turret turntable support 22 upon which there are rotatably located in the presently illustrated example a further scanning laser beam detector 23, a shearing-interferometer eyepiece 24 and a microscope eyepiece 25 including a graticule. For safety reasons this microscope eyepiece 25 is provided with a blocking filter 25' for the writing laser beam 7.

The laser beam collimator C, the lens head D and the optical module F comprising the lens head D and the turret E are illustrated in greater detail in the next-following drawings and are described in greater detail in the associated descriptions hereinafter. For reasons of clarity the turret E is shown in FIG. 1b in a developed or straight form. The correct circular shape of the turret E will be recognized hereinafter with respect to FIG. 6 of the drawings.

Figure 2:
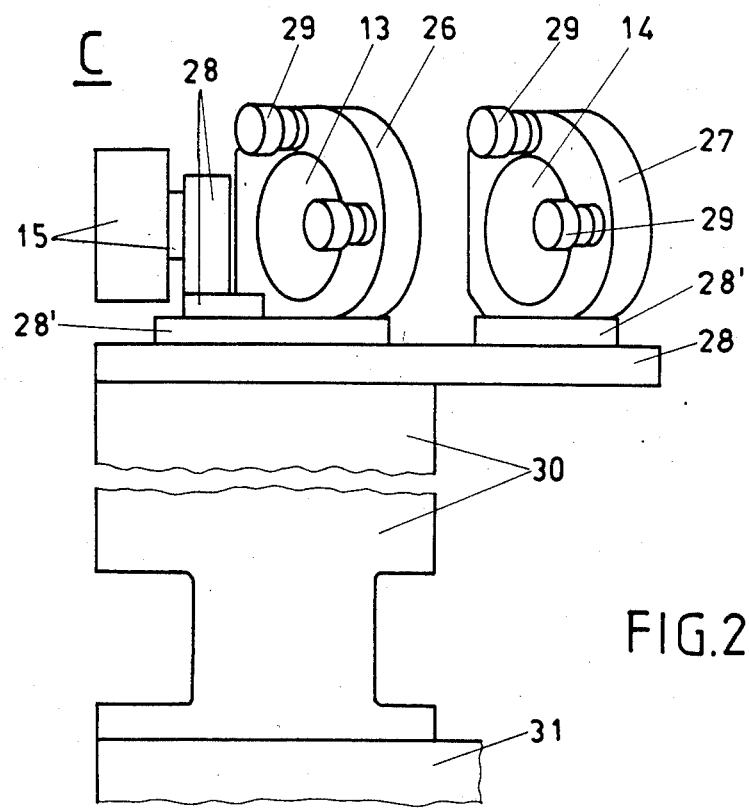

FIG. 2 shows a front view of the laser beam collimator C. At a first support 26 there is universally mounted the beam splitter 13 for the writing laser beam 7 which has been described already hereinbefore. In a similar manner the also already mentioned mirror 14 for the scanning laser beam 9' is arranged in a second support 27. A plural number of support elements 28 of the laser beam collimator C are not important for the function of the inventive method and apparatus, however, they are, of course, manufactured in a sufficiently robust manner, which is also true for guide plates 28' of the first support 26 and the second support 27 as well as for a connection member 30. First adjustment screws 29 serve for the adjustment or positioning of the first support 26 and the second support 27. The robust connection member 30 connects the support elements 28 and a work table 31. The writing laser beam detector 15, which also has already been mentioned hereinbefore, is mounted at a support element 28 shown in the left-hand portion of FIG. 2.

Figure 3:
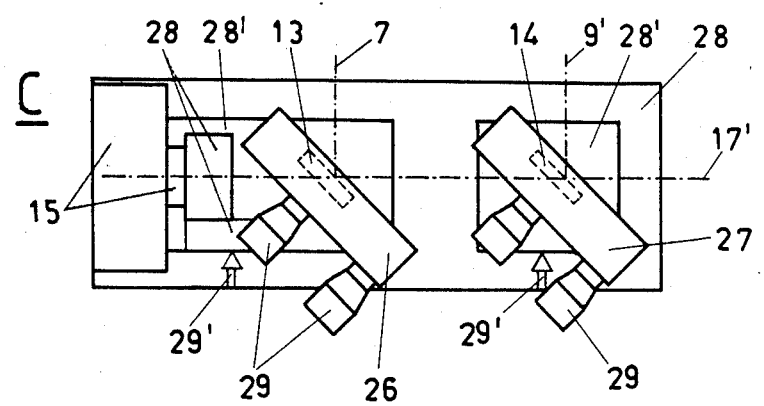
FIG. 3 is a top plan view of the laser beam collimator shown in FIG. 2.

FIG. 3 illustrates in a top plan view the constructional design of the laser beam collimator C shown in FIG. 2. The components of the laser beam collimator C have already been described hereinbefore. In FIG. 3 there are additionally shown second adjustment screws 29' and guide plates 28' which conjointly permit the correct positioning of the beam splitter 13 for the writing laser beam 7 and the mirror 14 for the scanning laser beam 9'.

Figure 4:
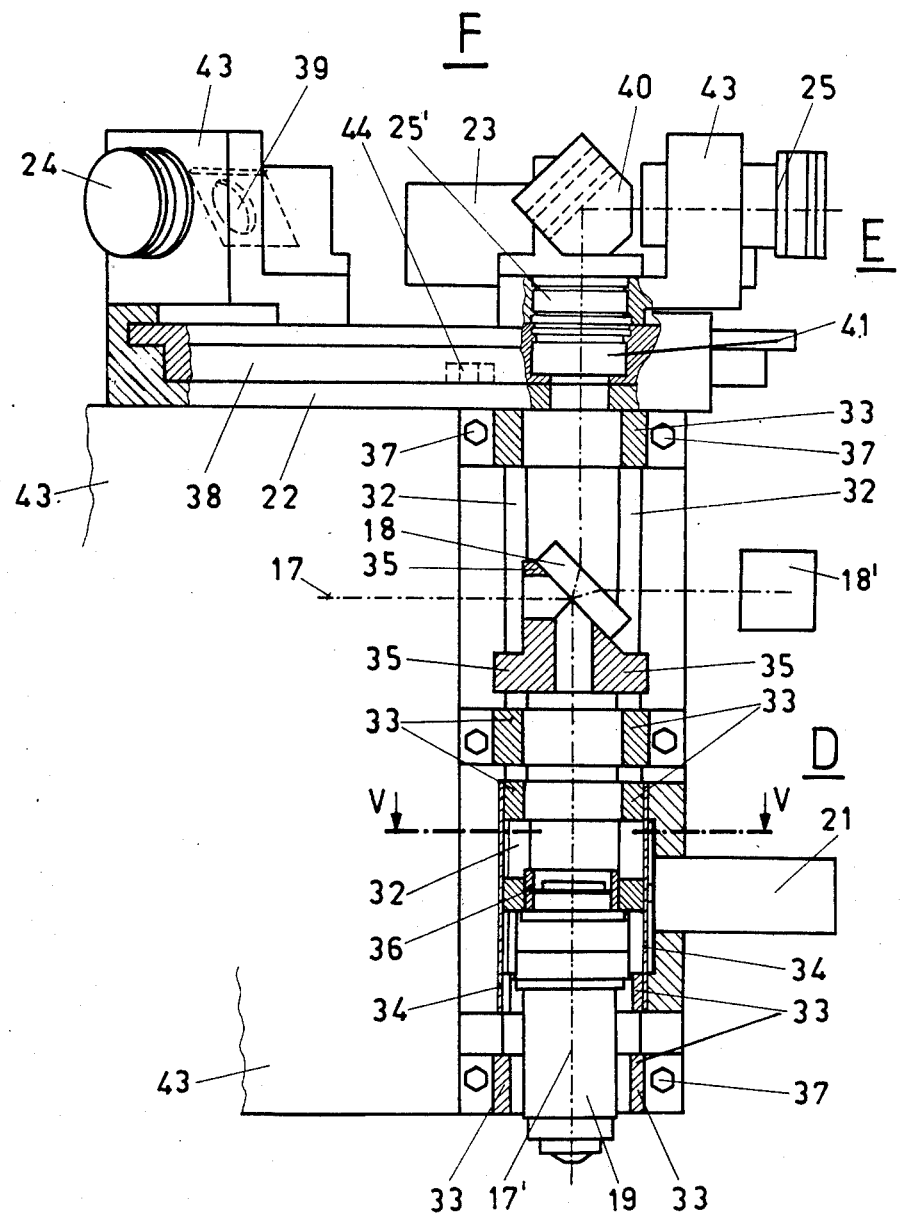

FIG. 4 shows a partial vertical section through the optical module F comprising the lens head D in its base or lower section and the turret E in its top or upper section. The components or members of the lens head D are held substantially by means of four guide rods 32 which extend parallel to the optical axis 17' through the entire lens head D and which are mounted in rod holders 33. In the lower portion of the lens head D the relative position of two rod holders 33 is fixed by means of two blade springs 34. The beam splitter 18 for the scanning laser beam 9' is mounted at a support 35.

The writing laser beam 7 and the scanning laser beam 9' which are coaxially superposed and guided along the same optical axis 17', pass from the left towards the beam splitter 18 for the scanning laser beam 9'. The common radiation path of the two laser beams is designated by the reference numeral 17. The lens means 19 are held by a holding or mounting ring 36 in addition to other, not particularly illustrated holding or mounting elements. It is self-explanatory that the components or members of the lens head D can be displaced along the four guide rods 32, whereby the optical members can be adjusted or positioned in an optimum position relative to each other. This concerns, of course, only the position of such members in the direction of the optical axis 17'. The piezo-electric drive 21 is provided for displacements transversely to the optical axis 17'. The rod holders 33 and the other holding or mounting elements are held together by means of screws or bolts 37 of which only some have been illustrated because they do not concern the inventive concept and because such screw connections are, of course, known as such.

A turret turntable 38 is rotatably connected with the top or upper section of the lens head D. The turret turntable support 22 serves to sufficiently tightly but rotatably mount or fix the turret turntable 38, and the turret turntable support 22 is fastened at a multi-membered carrier or support 43 by means of a mounting bolt 44.

In the illustrated example three individual elements are mounted at the turret E. A prism 40 should be first mentioned before the other elements, and by means of this prism 40 the horizontal section of the optical axis 17' can be deflected into a vertical direction. The eyepiece 24 of the shearing-interferometer includes a ground-glass plate and a parallel plate 39 which are not particularly illustrated. The turret E further contains the microscope eyepiece 25 including the graticule and the further scanning laser beam detector 23. These components are arranged at the turret turntable 38 which in the instant case comprises three bores 42. These bores 42 are well recognized in the more illustrative representation of the turret E in FIG. 6 which will be described hereinafter. Below the prism 40 and on the vertical section of the optical axis 17' there is mounted the blocking filter 25' for the writing laser beam 7 and a body tube lens 41.

FIG. 5 is a section along the line V—V in FIG. 4. This is thus a section through the lens head D and in this section the mounting of this lens head D is clearly visible. The multi-membered carrier or support 43 is shown in the upper part of FIG. 5. This multi-membered carrier or support 43 contains a thick plate and serves to receive the mounting bolt 44 for the turret E.

A simplified top plan view of the turret E is shown in FIG. 6. This illustration shows the scanning laser beam detector 23 with a locking pin 46 as well as the eyepiece 24 of the shearing-interferometer with the parallel plate 39 and the microscope eyepiece 25. All of these three members are rotatably mounted by means of a support or holder member 45, so that the desired member or apparatus can be aligned to the optical axis 17' of the lens head D in any desired manner. In this illustration there is also visible the multi-membered carrier or support 43 at which the turret E is mounted.

FIG. 7 shows in a simplified manner an exemplary embodiment of a radiation detector, in the illustrated example the further scanning laser beam detector 23 which is composed of a plural number of fields or active regions 47. During correct function of the inventive apparatus the central field or active region 47 is irradiated and in the case of a deviation from this desired position there are also covered one or more adjacent fields or regions 47. Since these fields or regions 47 can be individually evaluated, there is thus obtained information concerning the direction of the deviation from the correct position.

In the aforedescribed illustrated exemplary embodiment the writing laser device 1 constitutes a naturally air-cooled helium-cadmium laser system available from Liconix, Sunnyvale, Calif. 94086. This laser device comprises a current-regulated high-voltage power supply, Liconix Model 4200 PS, including cold and warm start-up facilities, time program and firing control, as well as a laser device Model 4110B. The main features of the writing laser device 1 are the following: light wavelength 442 nm, light power (continuous) 10 mW, standard intensity distribution over the beam diameter, horizontal polarization direction with deviations of ±5%, and the beam diameter is 1.1 mm.

The scanning laser device 9 constitutes a naturally air-cooled Melles-Griot helium-neon laser system available from ILEE AG, Schlieren, Switzerland, and which comprises a laser device Model 05-LHP-111 and a power supply Model 05-LPN-340, 1800 V, 6.5 mA. The light wavelength is 633 nm, the light power is 1 mW; the deviation of the beam axis after cold-start is smaller than 200 $\mu$Rad and 30 $\mu$Rad after 15 minutes of operation. The beam divergence amounts to less than 1.3 mRad and the regulation error of the light power is smaller than ±5%.

The modulator 3 constitutes a naturally air-cooled, electrically controlled blue laser-light interrupter system (Coherent Associates, Danbury, Conn. 06810) and comprises a control device Model 31 and a modulator Model 3010. The modulator tube contains a refringent crystal of potassium dihydrogenephosphate which is imbedded in a liquid having the same refractive index and which crystal is provided with two control electrodes and a photodiode-light meter attached to the output. The crystal acts in the manner of a polarization filter, the directional angle of which can be rotated through a 90° range by applying a voltage of approximately 600 V.

The expander 4 is composed of two convex lenses and a pin-hole having a diameter of 10 $\mu$m and arranged at the common focus of the two convex lenses. The expander 4 increases the diameter and decreases the divergence of the laser beam according to the expansion ratio, i.e. to the ratio of the focal point distances, and transmits the image of the light spot within the pin-hole in the output beam. The expander 4 thus, for example, removes dark points which are present in the incoming laser beam and which, for example, are due to dust, and also acts to make the direction of the output beam independent of the direction of the input beam.

A dichroic beam splitter is used as the beam splitter 13 for the writing laser beam 7 and comprises a parallel glass plate with a dielectric metal layer vapor-deposited upon one side of the glass plate. This dichroic beam splitter 13 permits the passage of light of a predetermined wavelength, i.e. of a predetermined color, in the same direction when such light impinges thereupon in the throughpass direction. During this passage the radiation exit point is offset depending on the refractive index of the glass for the predetermined wavelength and depending upon the thickness of the glass plate.

The piezo-electric drive 21 is a conventional drive and comprises, in the illustrated example, a Burley Model PZ70, 1000 V power supply and a Burley Model PZ40 piezo translator. The piezo crystal stack contained therein expands approximately proportional to the voltage applied thereto and displaces thereby the lens means 19 along the horizontal axis.

The microscope contains the lens means 19 and the microscope eyepiece 25. This lens means 19 comprises a convex lens system with or without a standard cover glass on the working side thereof and focuses the concentrically and parallelly entering blue and red laser beams to form the smallest possible focal spot at the working distance. The lens means 19 furthermore passes an enlarged virtual image of the green-colored illuminated image field extending concentrically with respect to the focal spot and which can be viewed by means of the microscope eyepiece 25. The microscope converts the mechanical displacement by means of the piezoelectric drive 21 into a displacement of the center of the image field and of the center of the focal spot.

The microscope eyepiece 25 is constructed as a convex lens system having the function of a magnifying lens and derives a magnified visible image from the virtual image produced by the lens means 19.

The shearing-interferometer contains a mirror which can be placed into the radiation path, the parallel glass plate 39, and the eyepiece 24. This unit constitutes a shearing-interferometer for measuring the deviation of the distance of the reflecting aluminum surface from the focal plane of the lens means 19.

The writing laser beam detector 15 and the scanning laser beam detectors 18' and 23 preferably are each composed of a central or inner, relatively insensitive and an external, more sensitive arrangement of silicon photodiodes. By means of the aforementioned detectors there is determined, on the basis of the laser beam reflected from the workpiece or on the basis of a laser beam obtained in any other suitable manner, whether the related laser beam is located in the correct position or is spaced in a certain direction from this correct position. The output signals generated by the detectors 15, 18' and 23 are evaluated in order to determine the relative positions of the workpiece G and the writing laser beam 7 and to possibly correct the relative movements of the workpiece G and the writing laser beam 7 such as to write the predetermined pattern.

FIGS. 8 to 13 illustrate in the form of schematic block diagrams other possible modifications or exemplary embodiments of the inventive apparatus.

Figure 8:
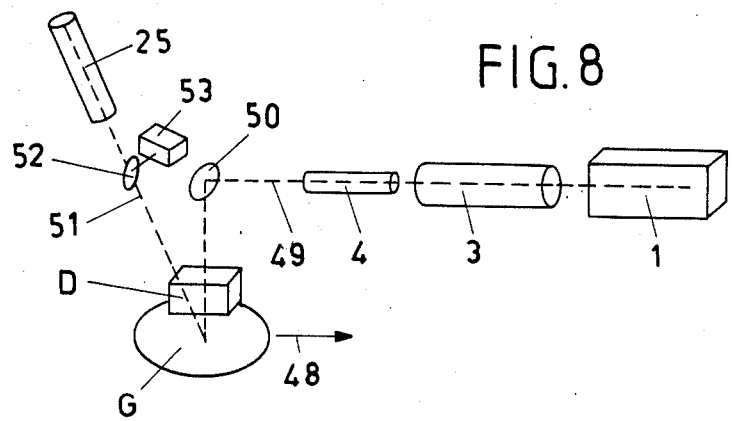
FIG. 8 is a schematic block diagram of a second exemplary embodiment of the inventive apparatus in which a single laser beam performs the scanning and writing operations.

FIG. 8 shows a simplified schematic block diagram of a second exemplary embodiment of the inventive apparatus which contains only a single writing laser device 1. The workpiece G is manufactured from a silicon plate; it is provided with the metalized three-dimensional raster or grid 62 illustrated in FIG. 15. An arrow 48 shows the direction of displacement of the workpiece G. The writing laser beam 49 generated by the writing laser device 1, passes through the modulator 3 and the expander 4 and impinges upon a deflecting mirror 50. The deflecting mirror 50 is positionally controllable in order to control the correct alignment between the writing laser beam 49 and the workpiece G. This writing laser beam 49 corresponds to the writing laser beam 7 illustrated in FIG. 1a and has been illustrated in broken lines for greater clarity. The writing laser beam 49 thereafter is guided through the lens head D containing the lens system or means 19 to the treated workpiece G. Reflected light 51 which originates from the writing laser beam 49 and which is reflected by the workpiece G, impinges upon a beam splitter 52. Part of the reflected light is directed by the beam splitter 52 to a radiation detector 53; another part of the reflected light passes through the beam splitter 52 into the microscope eyepiece 25.

Figure 9:
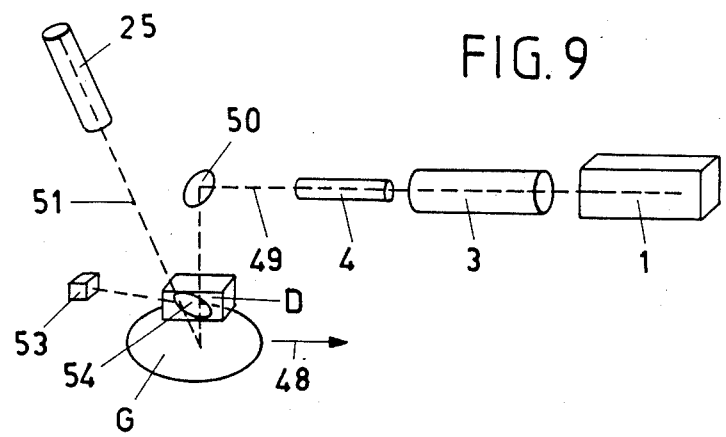
FIG. 9 is a schematic block diagram of a third embodiment of the inventive apparatus using a single laser beam for the writing and scanning operations and containing a polarized writing laser beam and a polarizing beam splitter.

A third embodiment of the inventive apparatus is schematically illustrated in the block diagram of FIG. 9 and substantially corresponds to the second embodiment illustrated in FIG. 8. Differently therefrom is a polarizing beam splitter 54 which is arranged in the interior of the lens head D. The polarizing beam splitter 54 directs light which is reflected from the workpiece G and which has a predetermined polarization direction, to the radiation detector 53.

Figure 10:
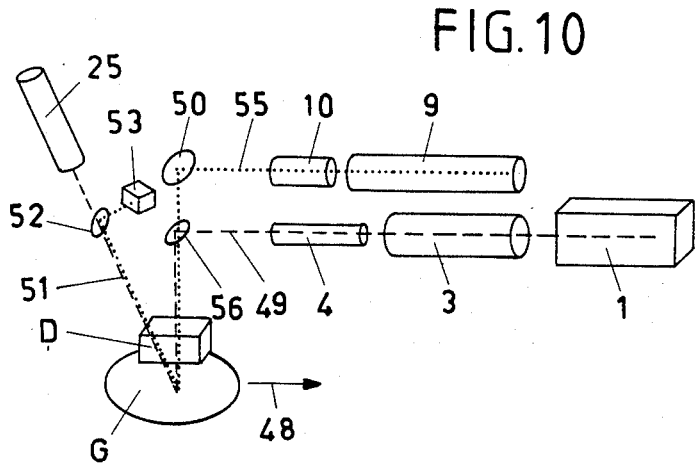
FIG. 10 is a schematic block diagram of a fourth embodiment of the inventive apparatus using a writing laser beam and a scanning laser beam and which laser beams possess different wavelengths.

A fourth embodiment of the inventive apparatus is schematically illustrated in FIG. 10 and additionally contains a scanning laser beam 55. This scanning laser beam 55 corresponds to the scanning laser beam 9' of the first exemplary embodiment illustrated in FIG. 1a, however, for reasons of greater clarity, is shown in dotted lines so that the function of the different laser beams is recognizable in FIG. 10. This embodiment is preferred in the case that two different wavelengths are required due to the nature of the surface of the workpiece G. The scanning laser beam 55 is generated by the scanning laser device 9 and is directed through the expander 10 to a deflecting mirror 50. The scanning laser beam 55 reflected by the deflecting mirror 50 passes through a dichroic beam splitter 56 and through the lens head D conjointly with the writing laser beam 49 and impinges upon the surface of the workpiece G. Both of the two laser beams impinge upon the workpiece G along the same line or pattern. Reflected light originating from the two laser beams impinges upon a beam splitter 52 also along the same line or pattern. By means of this beam splitter 52 the scanning laser beam 55 or reflected light originating from the scanning laser beam 55 is directed towards a radiation detector 53. The reflected writing laser beam 51 or reflected light originating from the writing laser beam 51 enters the microscope eyepiece 25.

Figure 11:
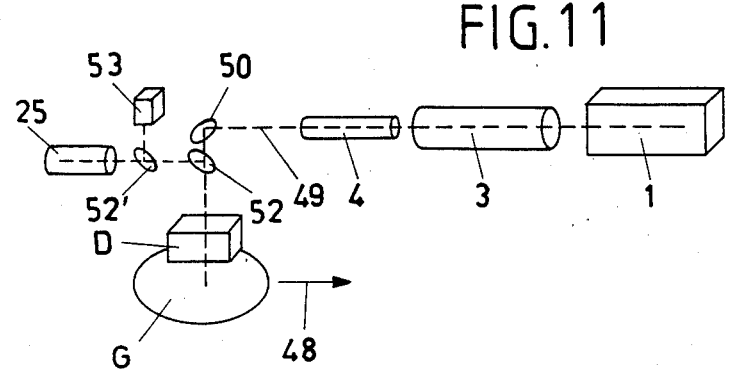
FIG. 11 is a schematic block diagram of a fifth embodiment of the inventive apparatus in which the writing laser beam impinges normally upon the workpiece and in which two beam splitters are provided.

In the fifth embodiment of the inventive apparatus schematically illustrated in FIG. 11, the beam splitter 52 is precedingly arranged relative to the lens head D. The reflected writing laser beam 49 is then passed by means of a further beam splitter 52 to the radiation detector 53 and into the microscope eyepiece 25.

Figure 12:
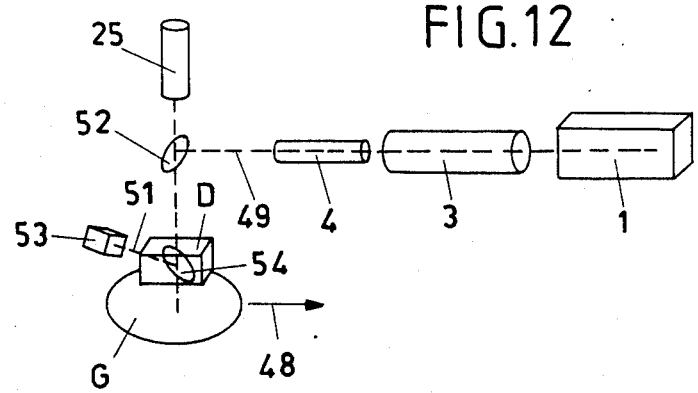
FIG. 12 is a schematic block diagram of a sixth embodiment of the inventive apparatus similar to the fifth embodiment shown in FIG. 11 and containing a polarizing beam splitter.

In the sixth embodiment of the inventive apparatus shown in a schematic block diagram in FIG. 12, the polarizing beam splitter 54 is directly arranged in the interior of the lens head D. Reflected light 51 of a predetermined polarization direction is passed thereby to the radiation detector 53. In this embodiment the microscope eyepiece 25 directly receives the reflected light from the beam splitter 52.

In the seventh embodiment of the inventive apparatus illustrated by a schematic block diagram in FIG. 13, there are again used the writing laser beam 49 as well as the scanning laser beam 55 which are directed normally to the workpiece G. The beam splitter 52 is arranged in the common radiation path of the two laser beams and simultaneously directs a portion of the light to the detector 53 and another portion of the light into the microscope eyepiece 25 similar to the manner illustrated in FIG. 12.

Figure 14:
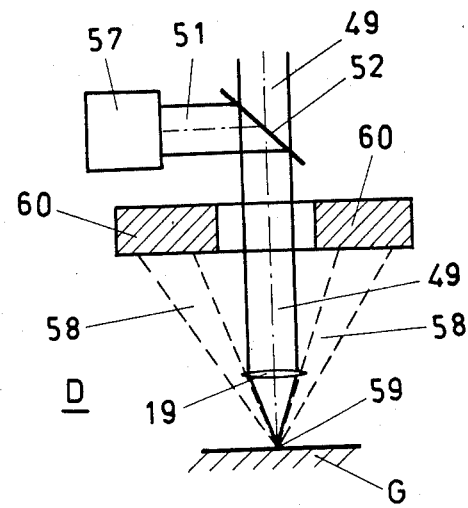
FIG. 14 is a schematic, partially sectional view of part of an eighth embodiment of the inventive apparatus containing a lens head and evaluating the reflected laser beam as well as scattered light originating from the laser beam.

FIG. 14 shows part of an eighth embodiment of the inventive apparatus in which the reflected light 51 as well as the scattered light 58 are detected. A radiation detector 57 serves to detect the reflected light 51 and a further radiation detector 60 serves to detect the scattered light 58. It is very well visible in FIG. 14 that the further radiation detector 60 for the scattered light 58 is arranged to extend around the writing laser beam 49.

Figure 15:
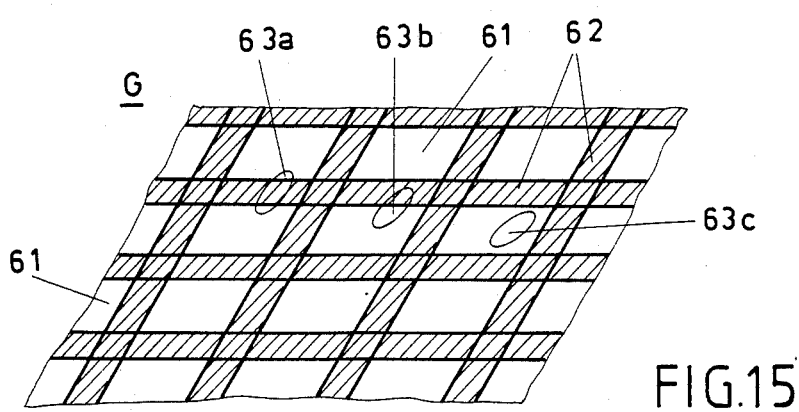
FIG. 15 is a perspective plan view showing the surface of a workpiece containing a metalized raster or grid and illustrating three exemplary positions of laser spots at the workpiece during treatment in the inventive apparatus.

A section of the workpiece G is illustrated in perspective in a very simplified manner in FIG. 15. Surfaces or regions containing the integrated circuit are designated by reference character 61 and a metalized raster or grid 62 serves as a reference structure. A laser beam spot is shown in three different positions designated by reference characters 63a, 63b and 63c. The laser beam spot 63a lies directly upon the metalized raster or grid 62, the laser beam spot 63b lies only partially upon the metalized raster or grid 62, and the laser beam spot 63c directly lies upon the surface or region containing the integrated circuit 61.

Figure 16A:
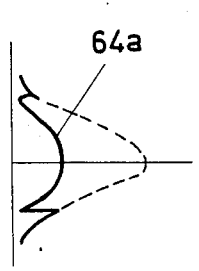
FIGS. 16a to 16c are graphs of three intensity distributions of laser light each of which corresponds to one of the laser spot positions illustrated in FIG. 15.
Figure 16B:
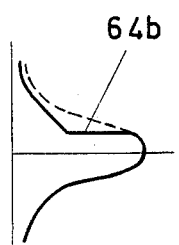
Figure 16C:
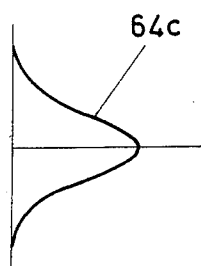

FIGS. 16a to 16c show intensity distributions of the reflected light corresponding to and originating from the aforementioned laser beam spots 63a to 63c. In FIG. 16a the ideal graph of the intensity distribution is shown in broken lines while the actual course of the intensity distribution is shown by the solid line 64a. Similarly, FIG. 16b shows a deviation of the curve 64b from the ideal condition. FIG. 16c shows the ideal condition which means that the real or actual course of the intensity distribution 64c is identical with the ideal course of the intensity distribution.

During the use of the inventive apparatus the metalized raster or grid 62 serves as a reference structure. The spacing of two raster strips amounts to, for example, about 7 μm and their width to, for example, about 5 μm, see FIG. 15.

In the last-mentioned embodiments of the inventive apparatus the writing laser device 1 may be, for example, an argon-ion laser having a power in the range of about 1 to about 5 mW at a wavelength of 458 nm and such laser can be obtained, for example, from Spectra Physics, Mountain View, Calif., Model 162A.07, or from American Laser Corporation, Salt Lake City, Utah, Model 60C. The writing laser device 1 also may be, for example, a helium-cadmium laser having a power in the range of about 7 to about 40 mW at a wavelength of 442 nm or a power in the range of about 1 to about 10 mW at a wavelength of 325 nm and such laser devices are respectively available as Model 4200·N or Model 4200 NB from Liconix, Sunnyvale, Calif.

The switching of the continuous laser power is effected by an electro-optical modulator or beam switch 3, for example, Model 3010 produced by Coherent Inc., Modulator Division, Palo Alto, Calif. The modulator may also constitute an acousto-optical modulator or beam switch, for example, Model 304D produced by the Modulator Division of Coherent Inc. The required switching time is determined by the writing rate and by the local resolution and, for example, may amount to about 2 μs.

The beam expander 4 which follows the modulator 3 increases the beam diameter, for example, to the 10-fold. The horizontal writing laser beam 49 is deflected into the vertical direction by means of the deflecting mirror 50. In this particular example the lens means 19 have a focal length of 18 mm and a diameter of 10 mm. The resulting spot size amounts to about 2 μm and the depth of focus is about 13 μm. The deflecting mirror 50 may be arranged in a controllable or adjustable manner.

In this example the scanning laser device 9 constitutes a helium-neon laser having a power of about 1 mW and a beam diameter of about 0.65 mm. This beam diameter is increased to the 4-fold by means of the expander 10 and the scanning laser beam 55 is superposed upon the writing laser beam 49 by means of an adjustable deflecting mirror 15.

Figure 13:
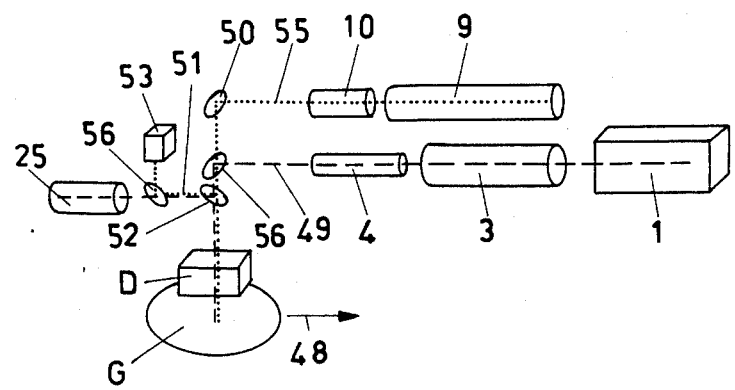
FIG. 13 is a schematic block diagram of a seventh embodiment of the inventive apparatus using a writing laser beam and a scanning laser beam and a dichroic beam splitter for the two different laser beams.

The mode of operation of the inventive apparatus has been partially described already hereinbefore. There exist a number of variants. Thus, the scanning and writing operations are performed by the same writing laser beam 49 using the second embodiment of the inventive apparatus illustrated in FIG. 8. Using the third embodiment of the inventive apparatus illustrated in FIG. 9, the writing laser beam 49 is transmitted to the surface of the workpiece G through a polarizing beam splitter 54 and in this particular case the polarizing beam splitter 54 serves as an optical analyzer with respect to the electro-optical modulator 3. The radiation detector 53, therefore, receives the same radiative power in the open state as well as in the closed state of the modulator or beam switch 3. In the fourth embodiment of the inventive apparatus illustrated in FIG. 10 separate laser beams are shown, namely a writing laser beam 49 and a scanning laser beam 55. The two laser beams, however, are substantially coaxially superposed substantially along the same optical axis, particularly by means of the dichroic beam splitter or mirror 56. This beam splitter or mirror 56 has the advantage of having 100% transmission for light of a first wavelength and 100% reflection for light of a second wavelength. This construction also permits focusing of the two laser beams using a single lens means. The various embodiments illustrated in FIGS. 11, 12 and 13 are particularly suited for the treatment of high-relief workpieces.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A method of generating by means of a writing laser beam a predetermined pattern on a workpiece containing a three-dimensional integrated circuit and which is provided with a metalized raster, said method comprising the steps of:

displacing said workpiece and said writing laser beam relative to each other along substantially line-like paths of movement;

scanning said metalized raster using said writing laser beam during said relative displacing movement of said workpiece and said writing laser beam and thereby generating reflected light originating from said writing laser beam;

modulating said writing laser beam during said scanning step of the operation;

placing a radiation detector so as to receive said reflected light originating from said writing laser beam and to generate corresponding output signals; and evaluating the output signals generated by said radiation detector in order to determine the relative positions of said workpiece and said writing laser beam and to possibly correct said relative displacing movements of said workpiece and said writing laser beam while writing said predetermined pattern.

2. The method as defined in claim 1, further including the step of:

during said step of scanning said metalized raster by using said writing laser beam and the step of modulating said writing laser beam, modulating an unattenuated writing laser beam.

3. The method as defined in claim 1, further including the step of:
during said step of scanning said metalized raster by using said writing laser beam and the step of modulating said writing laser beam, modulating an attenuated writing laser beam.

4. The method as defined in claim 1, further including the step of:
during said step of scanning said metalized raster by using said writing laser beam, transmitting said writing laser beam substantially normally to a treated surface of said integrated circuit contained in said workpiece.

5. The method as defined in claim 1, further including the step of:
during said step of scanning said metalized raster by using said writing laser beam, transmitting said writing laser beam at an angle in the range of about ±10° from a direction substantially normal to a treated region of said integrated circuit contained in said workpiece.

6. The method as defined in claim 1, further including the step of:
using a controllable beam deflector for correcting any deviations from said predetermined pattern during the step of displacing said workpiece and said writing laser beam relative to each other.

7. The method as defined in claim 6, further including the step of:
selecting a controllable deflecting mirror as said controllable beam deflector.

8. The method as defined in claim 7, further including the steps of:
passing said writing laser beam through lens means;
placing said lens means such as to precede said workpiece; and
arranging said controllable deflecting mirror such as to precede said lens means.

9. The method as defined in claim 6, further including the steps of:
selecting a controllable parallel plate as said controllable beam deflector; and
arranging said controllable parallel plate at an inclination relative to said writing laser beam.

10. The method as defined in claim 9, further including the steps of:
passing said writing laser beam through lens means;
placing said lens means such as to precede said workpiece; and
arranging said controllable parallel plate such as to follow said lens means.

11. The method as defined in claim 6, further including the step of:
selecting as said controllable beam splitter a controllable deflecting mirror and a controllable parallel plate arranged at an angle relative to said writing laser beam.

12. The method as defined in claim 11, further including the steps of:
passing said writing laser beam through lens means;
placing said lens means such as to precede said workpiece;
arranging said controllable deflecting mirror such as to precede said lens means; and
arranging said controllable parallel plate such as to follow said controllable deflecting mirror.

13. The method as defined in claim 6, further including the steps of:
passing said writing laser beam through lens means;
arranging said lens means such as to precede said workpiece and to be displaceable in a direction substantially
transversely to said writing laser beam; and displacing said lens means in order to correct said deviations from said predetermined pattern.

14. The method as defined in claim 13, further including the steps of:
arranging a controllable deflecting mirror such as to precede said lens means; and
using said displaceable lens means and said controllable deflecting mirror in order to correct said deviations from said predetermined pattern.

15. The method as defined in claim 14, further including the steps of:
arranging a controllable parallel plate at an angle relative to said writing laser beam and following said lens means; and
using said displaceable lens means, said controllable deflecting mirror, and said controllable parallel plate in order to correct said deviations from said predetermined pattern.

16. The method as defined in claim 1, further including the steps of:
providing a controllable gain signal amplifier;
controlling said gain of said controllable gain signal amplifier by means of a modulating signal generated during said step of modulating said writing laser beam; and
directly controlling said gain of said controllable gain signal amplifier such that constant output signals are obtained at said controllable gain signal amplifier also at different powers of said writing laser beam.

17. The method as defined in claim 1, further including the steps of:
providing an electro-optical modulator having two switching states for modulating said writing laser beam which constitutes a laser beam of polarized light; and
arranging an optical analyzer with respect to said electro-optical modulator between said electro-optical modulator and said workpiece and passing said polarized writing laser beam through said optical analyzer towards said workpiece during said step of scanning said metalized raster by using said polarized writing laser beam such that said radiation receiver receives the same power of light in both said switching states of said electro-optical modulator.

18. The method as defined in claim 1, further including the steps of:
providing a further radiation detector;
said step of scanning said metalized raster by using said writing laser beam entails the step of generating scattered light scattered by said workpiece and originating from said writing laser beam;
arranging said further radiation detector such as to receive said scattered light originating from said writing laser beam; and
determining the ratio of the output signals from said radiation detector and said further radiation detector in order to compensate for differences in local surface properties of the integrated circuits contained in said workpiece, said differences existing between the reflective properties and the scattering properties of said metalized raster and the material located below thereof.

19. A method of generating by means of a writing laser beam a predetermined pattern on a workpiece containing a three-dimensional integrated circuit and which is provided with a metalized raster, said method comprising the steps of:
generating a scanning laser beam;
substantially coaxially aligning said writing laser beam and said scanning laser beam;
displacing said workpiece and conjointly said substantially coaxially aligned writing laser beam and scanning laser beam relative to each other along substantially line-like paths of movement;
scanning said metalized raster conjointly by using said substantially coaxially aligned writing laser beam and scanning laser beam during said relative displacing movement of said workpiece and said coaxially aligned writing laser beam and scanning laser beam, and thereby generating reflected light originating from said writing laser beam and from said scanning laser beam;
placing at least one radiation detector so as to receive said reflected light originating at least from said scanning laser beam and to generate corresponding output signals; and
evaluating the output signals generated by said at least one radiation detector in order to determine the relative positions of said workpiece and said writing laser beam and to possibly correct said relative displacing movements of said workpiece and said substantially coaxially aligned writing laser beam and scanning laser beam while writing said predetermined pattern.

20. The method as defined in claim 19, further including the step of:
during said step of scanning said metalized raster by using said substantially coaxially aligned writing laser beam and scanning laser beam and the step of modulating said writing laser beam and said scanning laser beam, modulating an unattenuated writing laser beam.

21. The method as defined in claim 19, further including the step of:
during said step of scanning said metalized raster by using said substantially coaxially aligned writing laser beam and scanning laser beam and the step of modulating said writing laser beam and said scanning laser beam, modulating an attenuated writing laser beam.

22. The method as defined in claim 19, further including the step of:
during said step of scanning said metalized raster by conjointly using said substantially coaxially aligned writing laser beam and scanning laser beam, conjointly transmitting said substantially coaxially aligned writing laser beam and scanning laser beam substantially normally to a treated region of said integrated circuit contained in said workpiece.

23. The method as defined in claim 19, further including the step of:
during said step of scanning said metalized raster by conjointly using said substantially coaxially aligned writing laser beam and scanning laser beam, conjointly transmitting said substantially coaxially aligned writing laser beam and scanning laser beam at an angle in the range of about ±10° from a direction substantially normal to a treated region of said integrated circuit contained in said workpiece.

24. The method as defined in claim 19, further including the step of:
using a controllable beam deflector for said substantially coaxially aligned writing laser beam and scanning laser beam in order to correct any deviations from said predetermined pattern during the step of displacing said workpiece and said substantially coaxially aligned writing laser beam and scanning laser beam relative to each other.

25. The method as defined in claim 24, further including the step of:
selecting a controllable deflecting mirror as said controllable beam deflector for said substantially coaxially aligned writing laser beam and said scanning laser beam.

26. The method as defined in claim 25, further including the steps of:
conjointly passing said substantially coaxially aligned writing laser beam and scanning laser beam through lens means;
placing said lens means such as to precede said workpiece; and
arranging said controllable deflecting mirror such as to precede said lens means.

27. The method as defined in claim 24, further including the steps of:
conjointly passing said substantially coaxially aligned writing laser beam and scanning laser beam through lens means;
arranging said lens means such as to precede said workpiece and to be displaceable in a direction substantially transversely to said substantially coaxially aligned writing laser beam and scanning laser beam; and
displacing said lens means in order to correct said deviations from said predetermined pattern.

28. The method as defined in claim 24, further including the steps of:
selecting a controllable parallel plate as said controllable beam deflector; and
arranging said controllable parallel plate at an inclination relative to said substantially coaxially aligned writing laser beam and scanning laser beam.

29. The method as defined in claim 28, further including the steps of:
passing said substantially coaxially aligned writing laser beam and scanning laser beams through lens means;
placing said lens means such as to precede said workpiece; and
arranging said controllable parallel plate such as to follow said lens means.

30. The method as defined in claim 19, further including the step of:
selecting as said controllable beam splitter a controllable deflecting mirror and a controllable parallel plate arranged at an angle relative to said substantially coaxially aligned writing laser beam and scanning laser beam.

31. The method as defined in claim 30, further including the steps of:
passing said substantially coaxially aligned writing laser beam and scanning laser beam through lens means;
placing said lens means such as to precede said workpiece;

arranging said controllable deflecting mirror such as to precede said lens means; and arranging said controllable parallel plate such as to follow said controllable deflecting mirror.

32. The method as defined in claim 19, further including the steps of:

passing said substantially coaxially aligned writing laser beam and scanning laser beam through lens means;

arranging said lens means such as to precede said workpiece and to be displaceable in a direction substantially transversely to said substantially coaxially writing laser beam and scanning laser beam; and displacing said lens means in order to correct said deviations from said predetermined pattern.

33. The method as defined in claim 32, further including the steps of:

arranging a controllable deflecting mirror such as to precede said lens means; and using said displaceable lens means and said controllable deflecting mirror in order to correct said deviations from said predetermined pattern.

34. The method as defined in claim 33, further including the steps of:

arranging a controllable parallel plate at an angle relative to said substantially coaxially aligned writing laser beam and scanning laser beam and following said lens means; and using said displaceable lens means, said controllable deflecting mirror, and said controllable parallel plate in order to correct said deviations from said predetermined pattern.

35. The method as defined in claim 19, further including the steps of:

modulating said writing laser beam;

providing a controllable gain signal amplifier;

controlling said gain of said controllable gain signal amplifier by means of a modulating signal generated during said step of modulating said writing laser beam; and directly controlling said gain of said controllable gain signal amplifier such that constant output signals are obtained at said controllable gain signal amplifier also at different powers of said writing laser beam.

36. The method as defined in claim 19, further including the steps of:

providing an electro-optical modulator having two switching states for modulating at least said writing laser beam which constitutes a laser beam of polarized light; and arranging an optical analyzer with respect to said electro-optical modulator between said electro-optical modulator and said workpiece and passing said polarized writing laser beam through said optical analyzer towards said workpiece during said step of scanning said metalized raster using said substantially coaxially aligned writing laser beam and scanning laser beam such that said radiation receiver receives the same power of light in both said switching states of said electro-optical modulator.

37. The method as defined in claim 25, wherein:

said step of substantially coaxially aligning said writing laser beam and said scanning laser beam entails the step of arranging a dichroic beam splitter intermediate said workpiece and said deflecting mirror;

conjointly directing said substantially coaxially aligned writing laser beam and scanning laser beam along the same predetermined radiation path in order to compensate for different surface conditions of said integrated circuit contained in said workpiece and which surface conditions are unfavorable for said writing laser beam;

selecting as said writing laser beam a laser beam of a predetermined wavelength; and selecting as said scanning laser beam a laser beam of a predetermined wavelength which is different from said predetermined wavelength of said writing laser beam.

38. The method as defined in claim 37, further including the steps of:

arranging, in a laser beam collimator, a beam splitter which acts upon said writing laser beam, and a mirror which acts upon said scanning laser beam;

arranging lens means in a lens head;

conjointly reflecting said substantially coaxially aligned writing laser beam and scanning laser beam to said lens head in which said lens means are arranged; and deflecting a portion of said writing laser beam by means of said beam splitter to a writing laser beam detector.

39. The method as defined in claim 38, further including the steps of:

arranging a scanning laser beam splitter in said lens head;

conjointly passing said substantially coaxially aligned writing laser beam and scanning laser beam along a common optical axis through said laser beam collimator to said beam splitter acting upon said scanning laser beam and arranged in said lens head;

conjointly guiding said substantially coaxially aligned writing laser beam and scanning laser beam, by means of said beam splitter acting upon said scanning laser beam, through said lens means towards said workpiece;

providing a turret in a radiation path of said reflected light originating at least from said scanning laser beam; and reflecting a portion of said reflected light by means of said beam splitter which acts upon said scanning laser beam, along said predetermined radiation path to said turret.

40. The method as defined in claim 39, further including the steps of:

arranging said radiation detector which receives said reflected light originating from at least said scanning laser beam, at said lens head; and evaluating said output signals generated by said radiation receiver such as to obtain or detect the correct functional position of said workpiece relative to said substantially coaxially aligned writing laser beam and scanning laser beam.

41. The method as defined in claim 39, further including the steps of:

arranging a further radiation detector which receives said reflected light originating from at least said scanning laser beam, at said turret; and evaluating said output signals generated by said radiation receiver such as to obtain or detect the correct functional position of said workpiece relative to said substantially coaxially aligned writing laser beam and scanning laser beam.

42. An apparatus for generating a predetermined pattern using a writing laser beam on a workpiece containing an integrated circuit which is provided with a metalized raster, said apparatus comprising:
- a writing laser device generating said writing laser beam;
- a modulator following said writing laser device and acting upon the writing laser beam generated by said writing laser device;
- lens means acting upon said writing laser beam generated by said writing laser device and focusing said writing laser beam onto said workpiece;
- a beam splitter arranged in the path of said writing laser beam and generating a split beam of reflected light reflected from said workpiece; and
- a radiation receiver receiving said split beam of reflected light reflected from said workpiece and generated by said beam splitter.

43. The apparatus as defined in claim 42, wherein:
- said modulator constitutes an electro-optical modulator;
- said beam splitter constituting a polarizing beam splitter; and
- said polarizing beam splitter constituting an optical analyzer with respect to said electro-optical modulator.

44. The apparatus as defined in claim 42, further including:
- said writing laser device generating a writing laser beam of a predetermined wavelength;
- a scanning laser device generating a scanning laser beam having a predetermined wavelength which differs from said predetermined wavelength of said writing laser beam;
- a dichroic beam splitter acting upon said writing laser beam and said scanning laser beam such that said writing laser beam and said scanning laser beam are substantially coaxially superposed along a common radiation path;
- said beam splitter being arranged in the path of the reflected light reflected by said workpiece and generating as said split beam of said reflected light, a split beam of reflected light originating from said scanning laser beam; and
- a scanning laser beam detector for receiving said split beam of relfected light originating from said scanning laser beam and reflected by said workpiece.

45. The apparatus as defined in claim 42, further including:
- piezo-electric drive means for relatively positioning said writing laser beam and said integrated circuit contained in said workpiece in their correct position relative to each other;
- control means acting upon said piezo-electric drive means and containing a closed regulation loop; and
- said closed regulation loop comprising a series-connection of an operational amplifier and a high-voltage amplifier and said piezo-electric drive means.

46. The apparatus as defined in claim 44, further including:
- a lens head containing said lens means;
- a turret;
- said lens head and said turret conjointly forming an optical module; and
- a further beam splitter acting upon said substantially coaxially superposed writing laser beam and scanning laser beam and constituting the sole optical connection member between said lens head and said turret.

47. The apparatus as defined in claim 46, further including:
- a scanning laser beam detector arranged to follow said further beam splitter and to receive from said further beam splitter a split beam of said scanning laser beam.

48. The apparatus as defined in claim 47, further including:
- a laser beam collimator; and
- said laser beam collimator being provided with a writing laser beam detector.

49. The apparatus as defined in claim 47, further including:
- a further scanning laser beam detector;
- a shearing-interferometer eyepiece;
- a microscope eyepiece containing a graticule; and
- at least two of said further scanning laser beam detector, said shearing-interferometer eyepiece, and said microscope eyepiece being mounted at said turret.

50. The apparatus as defined in claim 42, wherein:
said expander contains at least one pin-hole.

51. The apparatus as defined in claim 44, further including:
- an expander acting upon said scanning laser beam generated by said scanning laser device; and
- said expander containing at least one pin-hole.

52. The apparatus as defined in claim 49, further including:
- a filter blocking said writing laser beam and being provided at said microscope eyepiece at said turret.

53. The apparatus as defined in claim 42, wherein:
said radiation receiver receiving said split beam of reflected light reflected from said workpiece through said beam splitter, comprises a plural number of fields.

54. The apparatus as defined in claim 44, wherein:
said radiation receiver receiving said split beam of reflected light originating from said scanning laser beam at said workpiece and reflected through said beam splitter, comprises a plural number of fields.

55. The apparatus as defined in claim 47, wherein:
said scanning laser beam detector comprises a plural number of fields.

56. The apparatus as defined in claim 48, wherein:
said writing laser beam detector comprises a plural number of fields.

57. The apparatus as defined in claim 49, wherein:
said further scanning laser beam detector comprises a plural number of fields.

58. The method as defined in claim 19, further including the steps of:
- selecting as said scanning laser beam, a laser beam having a predetermined wavelength;
- selecting as said writing laser beam, a laser beam having a predetermined wave length; and
- during said step of selecting said scanning laser beam, selecting a scanning laser beam having a predetermined wave length which is different from said predetermined wavelength of said writing laser beam.

* * * * *